(12) United States Patent
Nelson

(10) Patent No.: US 8,152,888 B2
(45) Date of Patent: *Apr. 10, 2012

(54) AIR FILTER

(75) Inventor: Benny Kevin Nelson, Waconia, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/456,967

(22) Filed: Jun. 24, 2009

(65) Prior Publication Data

US 2010/0018175 A1 Jan. 28, 2010

Related U.S. Application Data

(63) Continuation of application No. 11/271,112, filed on Nov. 10, 2005, now Pat. No. 7,569,090.

(60) Provisional application No. 60/627,603, filed on Nov. 12, 2004, provisional application No. 60/627,674, filed on Nov. 12, 2004.

(51) Int. Cl.
   *B01D 46/00* (2006.01)
(52) U.S. Cl. ............................ 55/498; 55/502; 55/521
(58) Field of Classification Search ............ 55/502, 55/498, 503, 520, 521, DIG. 5; 210/493.4, 210/497.1, 497.3; 156/210; 264/171.1, 257, 264/258, DIG. 48
See application file for complete search history.

(56) References Cited

U.S. PATENT DOCUMENTS

| | | |
|---|---|---|
| 3,025,963 A | 3/1962 | Bauer |
| 4,498,989 A | 2/1985 | Miyakawa et al. |
| 4,824,564 A | 4/1989 | Edwards et al. |
| 5,613,992 A | 3/1997 | Engel |
| 5,820,646 A * | 10/1998 | Gillingham et al. ............ 55/488 |
| 5,895,574 A * | 4/1999 | Friedmann et al. ............ 210/443 |
| 5,902,364 A * | 5/1999 | Tokar et al. ...................... 55/498 |
| 6,149,700 A * | 11/2000 | Morgan et al. ............... 55/385.3 |
| 6,190,432 B1 * | 2/2001 | Gieseke et al. .............. 55/385.3 |
| D450,827 S | 11/2001 | Gieseke et al. |
| 6,350,291 B1 * | 2/2002 | Gieseke et al. .............. 55/385.3 |
| 6,391,076 B1 * | 5/2002 | Jaroszczyk et al. ............. 55/498 |
| D461,003 S | 7/2002 | Gieseke et al. |

(Continued)

FOREIGN PATENT DOCUMENTS

JP 59-026113 2/1984

(Continued)

OTHER PUBLICATIONS

Exhibit A, Pending Claims Corresponding to U.S. Appl. No. 12/084,730, filed May 2011.

(Continued)

*Primary Examiner* — Duane Smith
*Assistant Examiner* — Minh-Chau Pham
(74) *Attorney, Agent, or Firm* — Merchant & Gould P.C.

(57) ABSTRACT

A filter cartridge is provided which comprises a media pack, a preform and a molded-in-place region of seal material. The media pack generally comprises a coiled arrangement of facing sheet secured to corrugated sheet. The preform includes a projection surrounding the media pack; the projection surrounding the media pack including a portion directed radially away from the media pack. The molded-in-place region of seal material defines: a radially outwardly directed surface defining a housing radial seal; and, has a portion with the projection of the preform that is directed radially away from the media pack embedded therein.

7 Claims, 13 Drawing Sheets

U.S. PATENT DOCUMENTS

| | | | |
|---|---|---|---|
| 6,416,605 B1 | 7/2002 | Golden | |
| D461,884 S | 8/2002 | Gieseke et al. | |
| D466,602 S | 12/2002 | Gieseke et al. | |
| 6,610,117 B2 | 8/2003 | Gieseke et al. | |
| 6,743,317 B2 | 6/2004 | Wydeven | |
| 6,783,565 B2 | 8/2004 | Gieseke et al. | |
| 6,887,343 B2 | 5/2005 | Schukar et al. | |
| D506,539 S | 6/2005 | Bishop et al. | |
| 6,953,124 B2 | 10/2005 | Winter et al. | |
| 7,255,300 B2 | 8/2007 | Johnston | |
| 7,261,756 B2 | 8/2007 | Merritt | |
| 7,318,851 B2 | 1/2008 | Brown et al. | |
| 7,329,326 B2 | 2/2008 | Wagner et al. | |
| 7,569,090 B2 * | 8/2009 | Nelson | 55/502 |
| 2003/0037675 A1 * | 2/2003 | Gillingham et al. | 95/280 |
| 2003/0121845 A1 | 7/2003 | Wagner et al. | |
| 2005/0166561 A1 | 8/2005 | Schrage et al. | |
| 2006/0090431 A1 | 5/2006 | Brown | |
| 2006/0091061 A1 | 5/2006 | Brown et al. | |
| 2006/0091064 A1 | 5/2006 | Brown et al. | |
| 2006/0091066 A1 | 5/2006 | Driml et al. | |
| 2006/0091084 A1 | 5/2006 | Merritt et al. | |
| 2007/0169449 A1 | 7/2007 | Merritt | |
| 2007/0186528 A1 | 8/2007 | Wydeven et al. | |
| 2007/0193236 A1 | 8/2007 | Merritt | |
| 2008/0011896 A1 | 1/2008 | Johnston et al. | |
| 2008/0060329 A1 | 3/2008 | Brown et al. | |
| 2008/0250763 A1 | 10/2008 | Widerski et al. | |

FOREIGN PATENT DOCUMENTS

| | | |
|---|---|---|
| JP | 62-11413 | 8/1988 |
| WO | WO 97/40918 | 11/1997 |
| WO | WO 00/50149 | 8/2000 |
| WO | WO 2004/007054 | 1/2004 |
| WO | WO 2005/014909 | 2/2005 |
| WO | WO 2005/077487 | 8/2005 |
| WO | WO 2006/009766 | 1/2006 |

OTHER PUBLICATIONS

Exhibit B, Pending Claims Corresponding to U.S. Appl. No. 11/629,033, filed May 2001.

Exhibit C, Statement of Thomas Miller, Jan. 2011.

Exhibit D, Second Statement of Thomas Miller, Jan. 2011.

* cited by examiner

AIR FILTER

CROSS-REFERENCE TO RELATED APPLICATIONS

The present application is a continuation of U.S. Ser. No. 11/271,112, filed Nov. 10, 2005, now issued as U.S. Pat. No. 7,569,090; and, which was filed with a priority claim to U.S. Provisional Application Serial No. 60/627,603, filed Nov. 12, 2004, and U.S. Provisional Application Serial No. 60/627,674, filed Nov. 12, 2004. A claim of priority to U.S. Ser. No. 11/271,112 and to each of provisionals 60/627,603 and 60/627,674 is made to the extent appropriate. Also, each of U.S. Ser. Nos. 11/271,112, 60/627,603, and 60/627,674 is incorporated herein by reference.

TECHNICAL FIELD

The present disclosure concerns air cleaners, for use, for example, for cleaning engine combustion air for vehicles and other equipment. The disclosure provides preferred components, assemblies and methods.

BACKGROUND

Gas streams often carry particulate material therein. In many instances it is desirable to remove some or all of the particulate material from the gas flow stream. For example, air intake streams to engines for motorized vehicles or power generation equipment often include particulate material therein. The particulate material, should it reach the internal workings of the mechanisms involved, can cause substantial damage. It is therefore preferred, for such systems, to remove the particulate material from the gas flow upstream of the engine or other equipment involved. A variety of air cleaner arrangements have been developed for particulate removal.

There has been a general trend for the utilization of air cleaner arrangements that utilize, as a media pack, z-filter media constructions. In general z-filter media constructions can be characterized as comprising a fluted sheet secured to a facing sheet, formed into a media pack configuration. Examples of z-filter arrangements are described in PCT Publication WO 97/40918, published Nov. 6, 1997; U.S. Pat. Nos. 6,190,432 and 6,350,291; PCT application US 04/07927, filed Mar. 17, 2004; U.S. Provisional application 60/532,783, filed Dec. 22, 2003; PCT Publication 03/095068, published Nov. 20, 2003; PCT publication WO 04/007054, published Jan. 22, 2004; PCT publication WO 03/084641, published Oct. 16, 2003; and, U.S. Provisional Application 60/543,804, filed Feb. 11, 2004; the complete disclosures of each of these cited references being incorporated herein by reference.

In general, improvements have been sought.

SUMMARY OF THE DISCLOSURE

According to the present disclosure, various features and techniques are provided, for advantageous methods for preparing components for air cleaner arrangements. Some preferred components are provided, as well as assemblies which use those components. Also, methods of service and use are provided.

A preferred method, involving: (a) applying a winding bead to a center of a corrugated sheet of a single facer strip; (b) coiling into a coil; and (c) cutting the coil through the winding bead, to form two media packs, is described. An example use of such a media pack is described in connection with FIGS. 7-14, although alternative uses are possible.

In another aspect, the present disclosure relates to the provision of a filter cartridge arrangement comprising a media pack formed from a facing sheet secured to a corrugated sheet to define inlet flutes and outlet flutes extending between first and second opposite flow faces. The cartridge includes a preform secured to the media pack and having a grid arrangement extending across one of the flow faces. A region of cured seal material is positioned on the grid arrangement in contact with the first flow face, to secure the grid arrangement to the flow face. A variety of additional specific preferred features are provided. In addition methods of assembly and use are provided.

In alternate applications or aspects, the described grid is an option, and a preferred preform having a region extending around the media pack, with a seal molded thereto, is described. Again methods of assembly and use are provided.

Specific componentry, techniques and configurations disclosed herein can be used together, as illustrated in the embodiments, to advantage. However they may be separately selected and used to create alternate advantageous arrangements. Thus, there is no specific requirement for arrangements according to the present disclosure, that all of the various advantageous features disclosed be present.

DETAILED DESCRIPTION

I. Z-Filter Media Configurations, Generally

Figure 1:
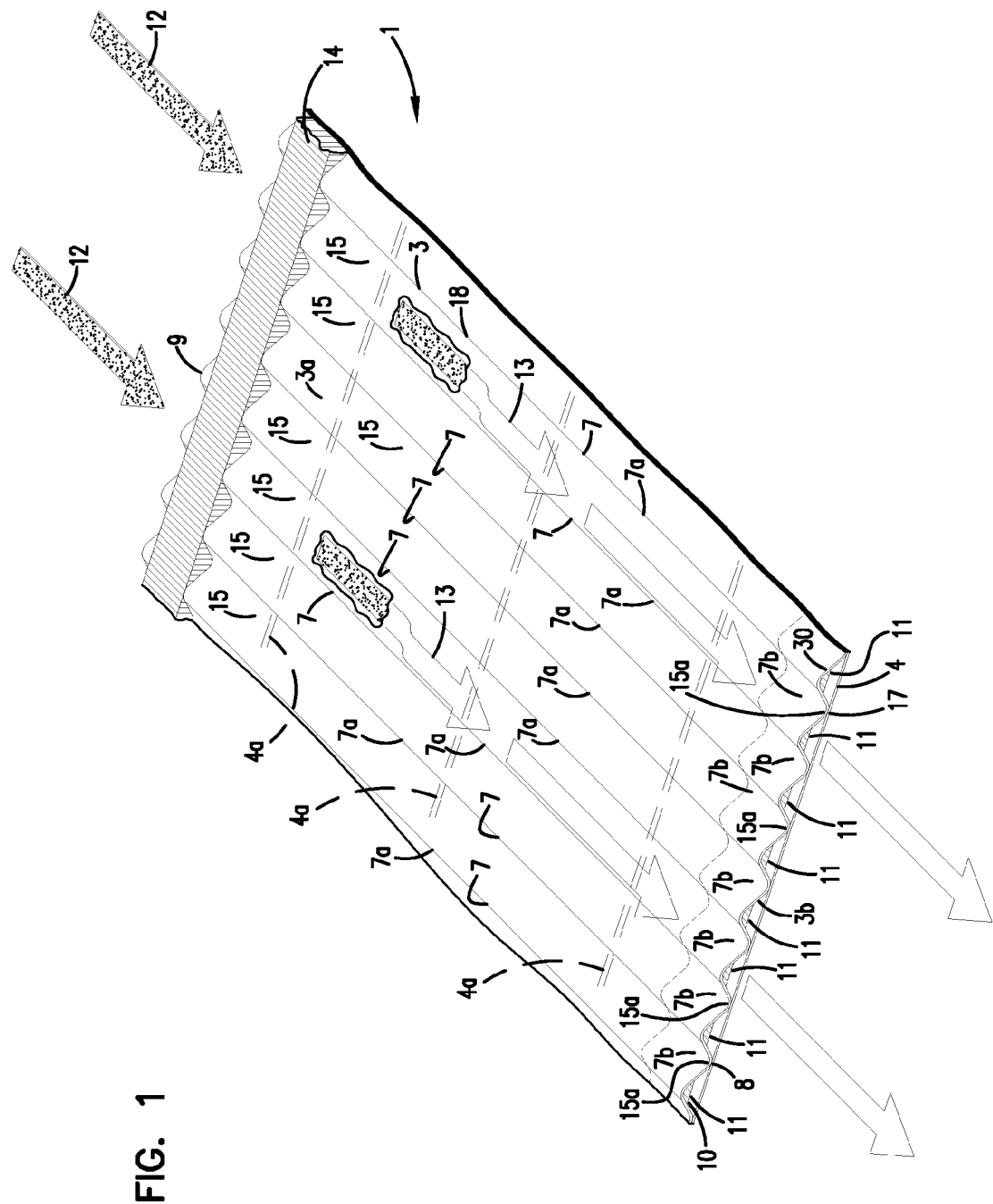
FIG. 1 is a fragmentary, schematic, perspective view of z-filter media useable in arrangements according to the present disclosure.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895, 574; 6,210,469; 6,190,432; 6,350,296; 6,179,890; 6,235,195; Des. Pat. Nos. 399,944; 428,128; 396,098; 398,046; and, 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to facing media, are stacked on one another, to create a filter construction. An example of this is described in FIG. 11 of U.S. Pat. No. 5,820,646, incorporated herein by reference.

For specific applications as described herein, coiled arrangements are preferred. Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, each of which is incorporated herein by reference. The resulting coiled arrangement generally has, as the outer surface of the media pack, a portion of the facing sheet.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by such techniques as corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid cleaner. In some instances, each of the inlet flow end and outlet flow end will be generally flat or planar, with the two parallel to one another. However, variations from this, for example non-planar faces are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to facing media with appropriate sealing to allow for definition of inlet and outlet flutes; or, such a media coiled or otherwise constructed or formed into a three dimensional network of inlet and outlet flutes; and/or, a filter construction including such media.

In FIG. 1, an example of media 1 useable in z-filter media is shown. The media 1 is formed from a corrugated (fluted) sheet 3 and a facing sheet 4.

In general, the corrugated sheet 3, FIG. 1, is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the straight segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 the sheets 3, 4 are sealed to one another, for example by sealant, in this instance in the form of a sealant bead 10, sealing the corrugated (fluted) sheet 3 and the facing sheet 4 together. Bead 10 will sometimes be referred to as a "single facer" bead, when it is applied as a bead between the corrugated sheet 3 and facing sheet 4, to form the single facer or media strip 1. Sealant bead 10 seals closed individual flutes 11 adjacent edge 8, to passage of air therefrom.

Adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" when it is applied as the strip 1 is coiled into a coiled media pack. If the media 1 were cut in strips and stacked, instead of coiled, bead 14 would be a "stacking bead."

In some applications, the corrugated sheet 3 is also tacked to the facing sheet 4 at various points along the flute length, as shown at lines 4a.

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction. However, in typical air filter applications, at one end or face of the media pack unfiltered air flow in, and at an opposite end or face the filtered air flow out, with no unfiltered air flow through the pack or between the faces.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3, facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 2:
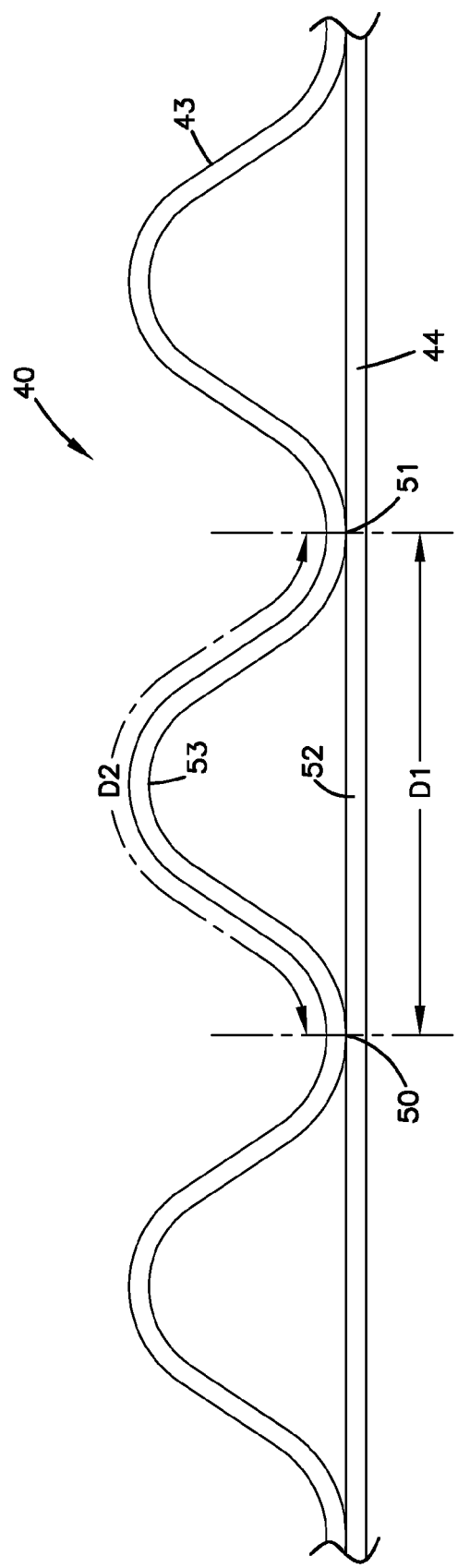
FIG. 2 is a schematic, cross-sectional view of a portion of the media depicted in FIG. 1.

Attention is now directed to FIG. 2, in which a z-filter media construction 40 utilizing a regular, curved, wave pattern corrugated sheet 43, and a facing (in this instance non-corrugated) sheet 44, is depicted. The distance D1, between points 50 and 51, defines the extension of facing media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0 time D1, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated (fluted) media.

Figure 3:
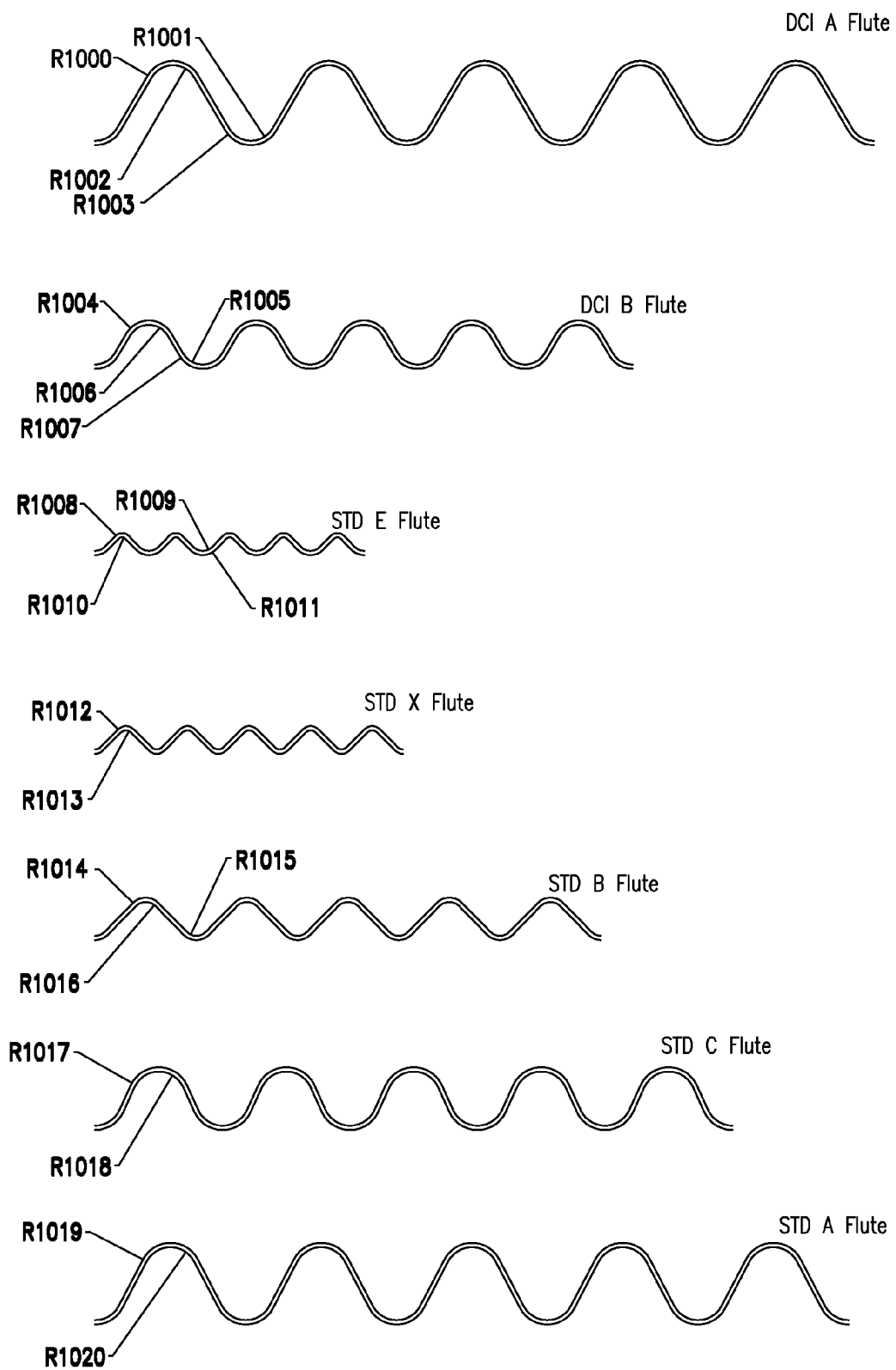
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; |
| | The Radii (R) are as follows: |
| | R1000 = .0675 inch (1.715 mm); |
| | R1001 = .0581 inch (1.476 mm); |
| | R1002 = .0575 inch (1.461 mm); |
| | R1003 = .0681 inch (1.730 mm). |
| DCI B Flute: | Flute/flat = 1.32:1; The Radii (R) are as follows: |
| | R1004 = .0600 inch (1.524 mm); |
| | R1005 = .0520 inch (1.321 mm); |
| | R1006 = .0500 inch (1.270 mm); |
| | R1007 = .0620 inch (1.575 mm). |
| Std. E Flute: | Flute/flat = 1.24:1; The Radii (R) are as follows: |
| | R1008 = .0200 inch (.508 mm); |
| | R1009 = .0300 inch (.762 mm); |
| | R1010 = .0100 inch (.254 mm); |
| | R1011 = .0400 inch (1.016 mm). |
| Std. X Flute: | Flute/flat = 1.29:1; The Radii (R) are as follows: |
| | R1012 = .0250 inch (.635 mm); |
| | R1013 = .0150 inch (.381 mm). |
| Std. B Flute: | Flute/flat = 1.29:1; The Radii (R) are as follows: |
| | R1014 = .0410 inch (1.041 mm); |
| | R1015 = .0310 inch (.7874 mm); |
| | R1016 = .0310 inch (.7874 mm). |
| Std. C Flute: | Flute/flat = 1.46:1; The Radii (R) are as follows: |

TABLE A-continued (Flute definitions for FIG. 3)

| | |
|---|---|
| | R1017 = .0720 inch (1.829 mm); |
| | R1018 = .0620 inch (1.575 mm); |
| Std. A Flute: | Flute/flat = 1.53:1; The Radii (R) are as follows: |
| | R1019 = .0720 inch (1.829 mm); |
| | R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

II. Manufacture of Coiled Media Configurations Using Fluted Media, Generally

Figure 4:
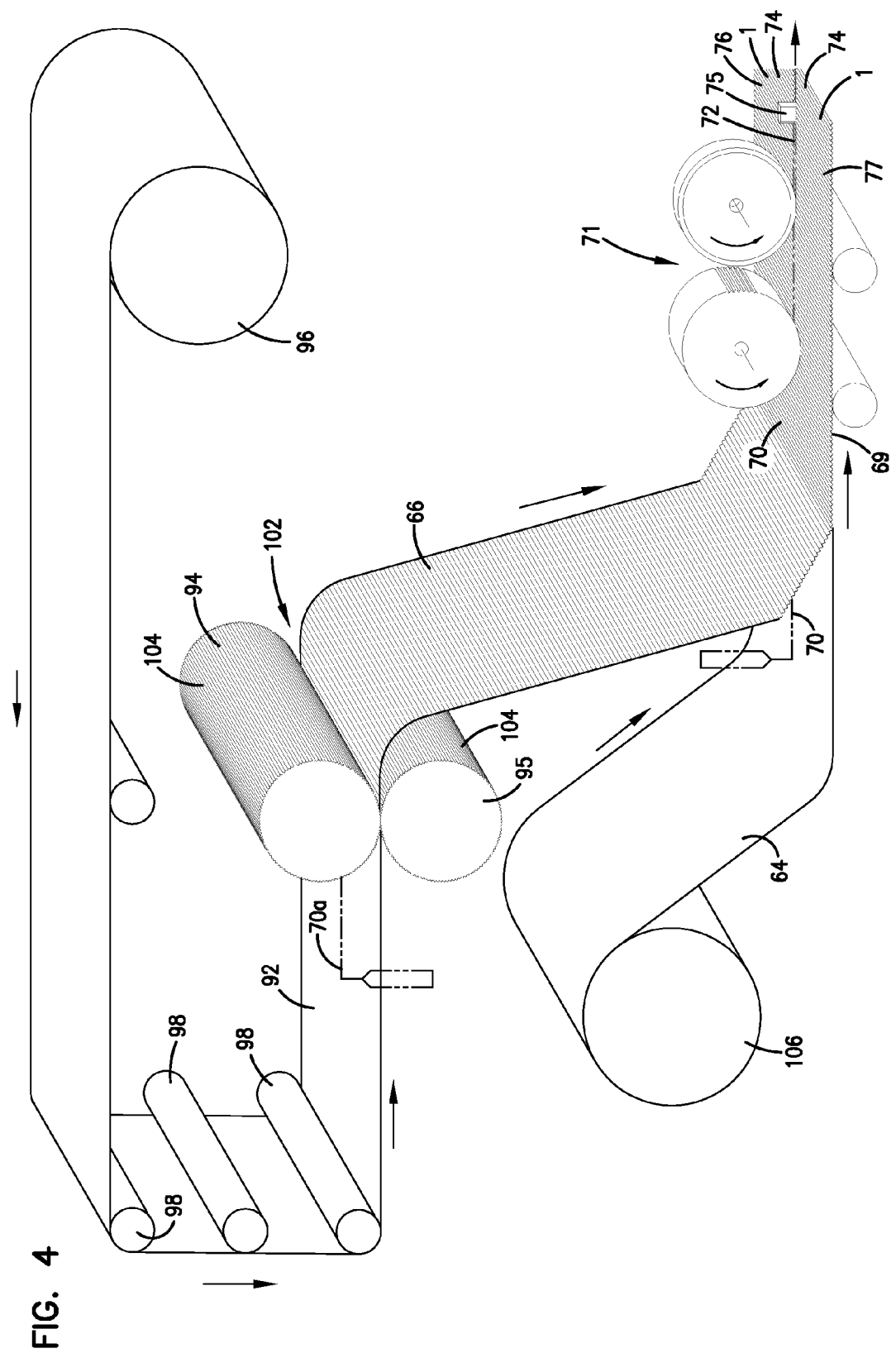
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Also, if tack beads or other tack connections 4a, FIG. 1, are used, they can be made, as the sheets 64, 66 are brought together.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One preferred corrugation pattern will be a regular curved wave pattern corrugation of straight flutes, as defined herein above. A typical regular curved wave pattern used, would be one in which the distance D2, as defined above, in a corrugated pattern is at least 1.2 times the distance D1 as defined above. In one preferred application, typically D2=1.25-1.35×D1. In some instances the techniques may be applied with curved wave patterns that are not "regular," including, for example, ones that do not use straight flutes.

Figure 5:
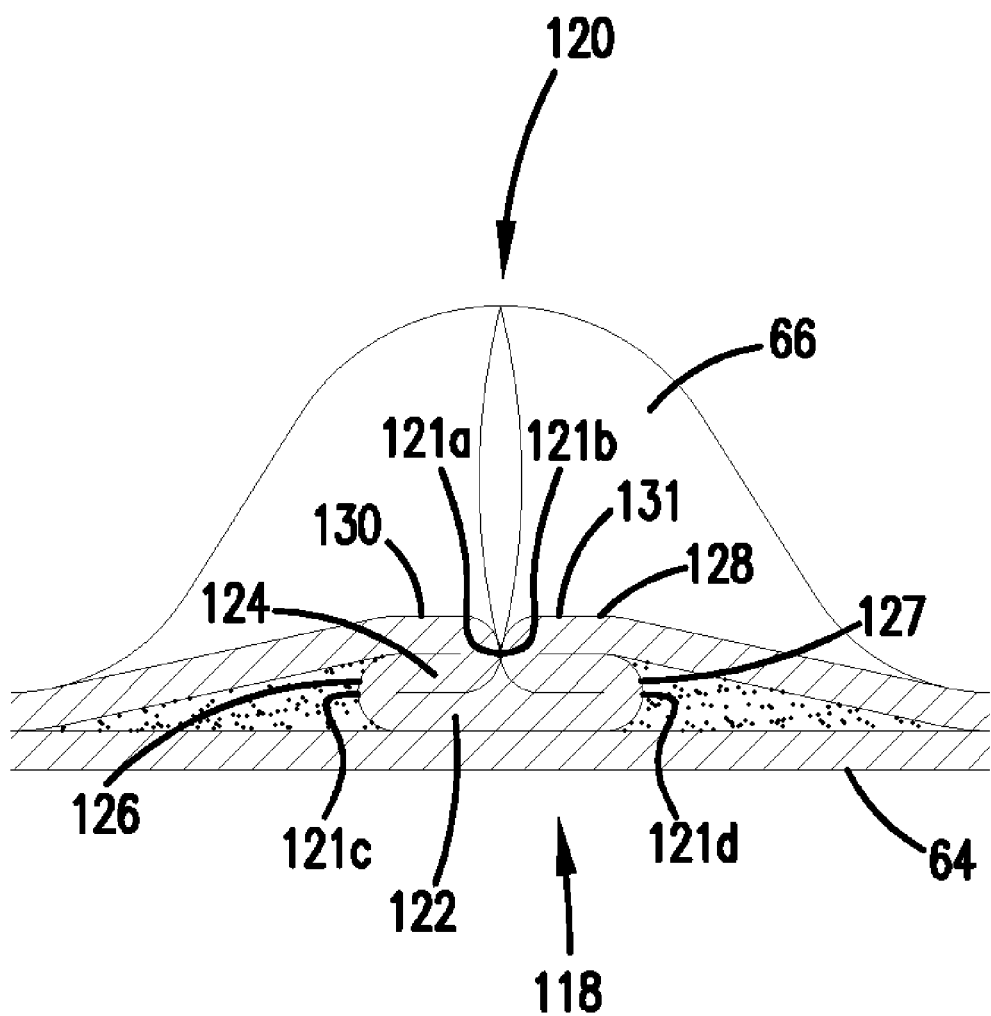
FIG. 5 is a cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 522 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements folded against, the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and incorporated herein by reference.

Techniques described herein are particularly well adapted for use with media packs that result from coiling a single sheet comprising a corrugated sheet/facing sheet combination, i.e., a "single facer" strip. Certain of the techniques can be applied with arrangements that, instead of being formed by coiling, are formed from a plurality of strips of single facer.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US 04/07927.

Another way of describing the peripheral or perimeter shape is by defining the perimeter resulting from taking a cross-section through the media pack in a direction orthogonal to the winding axis of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack. Examples of such media pack arrangements are shown in U.S. Provisional Application 60/578,482, filed Jun. 8, 2004, incorporated herein by reference.

The flute seals (for example from the single facer bead, winding bead or stacking bead) can be formed from a variety of materials. In various ones of the cited and incorporated references, hot melt or polyurethane seals are described as possible for various applications. Such materials are also useable for arrangements as characterized herein.

When the media is coiled, generally a center of the coil needs to be closed, to prevent passage of unfiltered air between the flow faces; i.e., through the media pack. Some approaches to this are referenced below. Others are described in U.S. Provisional 60/578,482, filed Jun. 8, 2004; and U.S. Provisional 60/591,280, filed Jul. 26, 2004.

The media chosen for the corrugated sheet and facing sheet can be the same or different. Cellulose fiber, synthetic fiber or mixed media fiber materials can be chosen. The media can be provided with a fine fiber layer applied to one or more surface, for example in accord with U.S. Pat. No. 6,673,136, issued Jan. 6, 2004, the complete disclosure of which is incorporated herein by reference. When such material is used on only one side of each sheet, it is typically applied on the side(s) which will form the upstream side of inlet flutes.

III. Example Arrangement

A. General Background Regarding Air Cleaner Systems.

Figure 6:
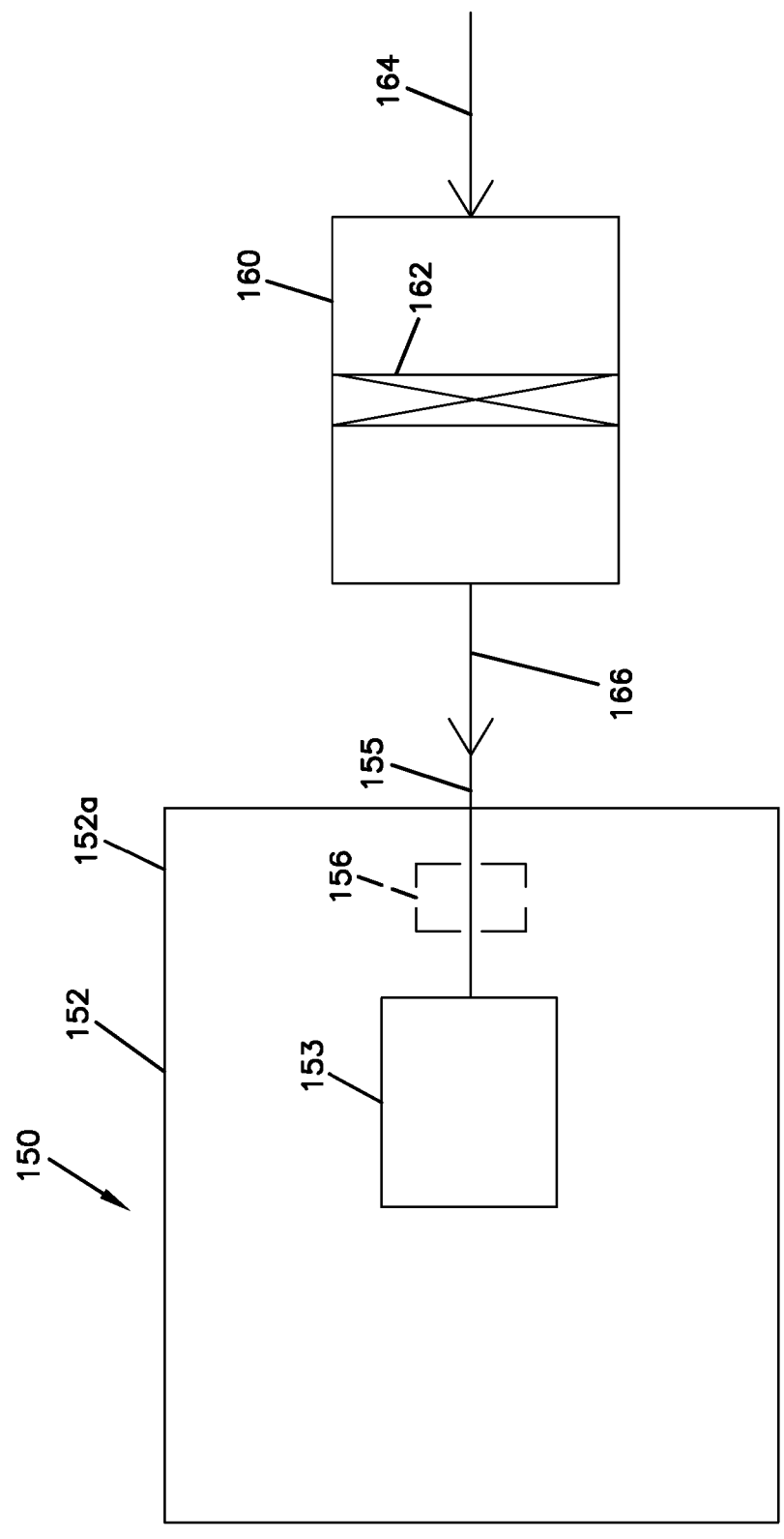
FIG. 6 is a schematic view of a system using an air cleaner having a filter cartridge component according to the present disclosure.

The principles and arrangements described herein are useable in a variety of systems. One particular system is depicted schematically in FIG. 6, generally at 150. In FIG. 6, equipment 152, such as a vehicle 152a having an engine 153 with some defined rated air flow demand, for example in the range of 50 cfm to 2000 cfm (cubic feet per minute) (i.e., 1.4-57 cubic meters/minute) is shown schematically. Although alternatives are possible, the equipment 152 may, for example, comprise a bus, an over-the-highway truck, an off-road vehicle, a tractor, a light-duty or medium-duty truck, or a marine vehicle such as a power boat. The engine 153 powers the equipment 152 upon fuel combustion. In FIG. 6, air flow is shown drawn into the engine 153 at an air intake at region 155. An optional turbo 156 is shown in phantom, as optionally boosting the air intake to the engine 153. The turbo 156 is shown downstream from an air cleaner 160, although alternate arrangement are possible.

The air cleaner 160 has a filter cartridge 162 and is shown in the air inlet stream to the engine 153. In general, in operation, air is drawn in at arrow 164 into the air cleaner 160 and through the filter cartridge 162. Upon passage through the air cleaner 160, selected particles and contaminants are removed from the air. The cleaned air then flows downstream at arrow 166 into the intake 155. From there, the air flow is directed into the engine 153.

In a typical air cleaner 160, the filter cartridge 162 is a serviceable component. That is, the cartridge 162 is removable and replaceable within the air cleaner 160. This allows the cartridge 162 to be serviced, by removal and replacement, with respect to remainder of air cleaner 160, when the cartridge 162 becomes sufficiently loaded with dust or other contaminant, to require servicing.

B. An Example Air Filter Cartridge.

The example air filter cartridge and components depicted in FIGS. 7-15 are also described in a co-filed U.S. Provisional application entitled "Filter Arrangements; Housings; Assemblies; and, Methods" filed Nov. 12, 2004, identifying Ben Nelson as inventor and filed under Express Mail #EV 541525103 US; the complete disclosure of which is incorporated herein by reference.

Figure 7:
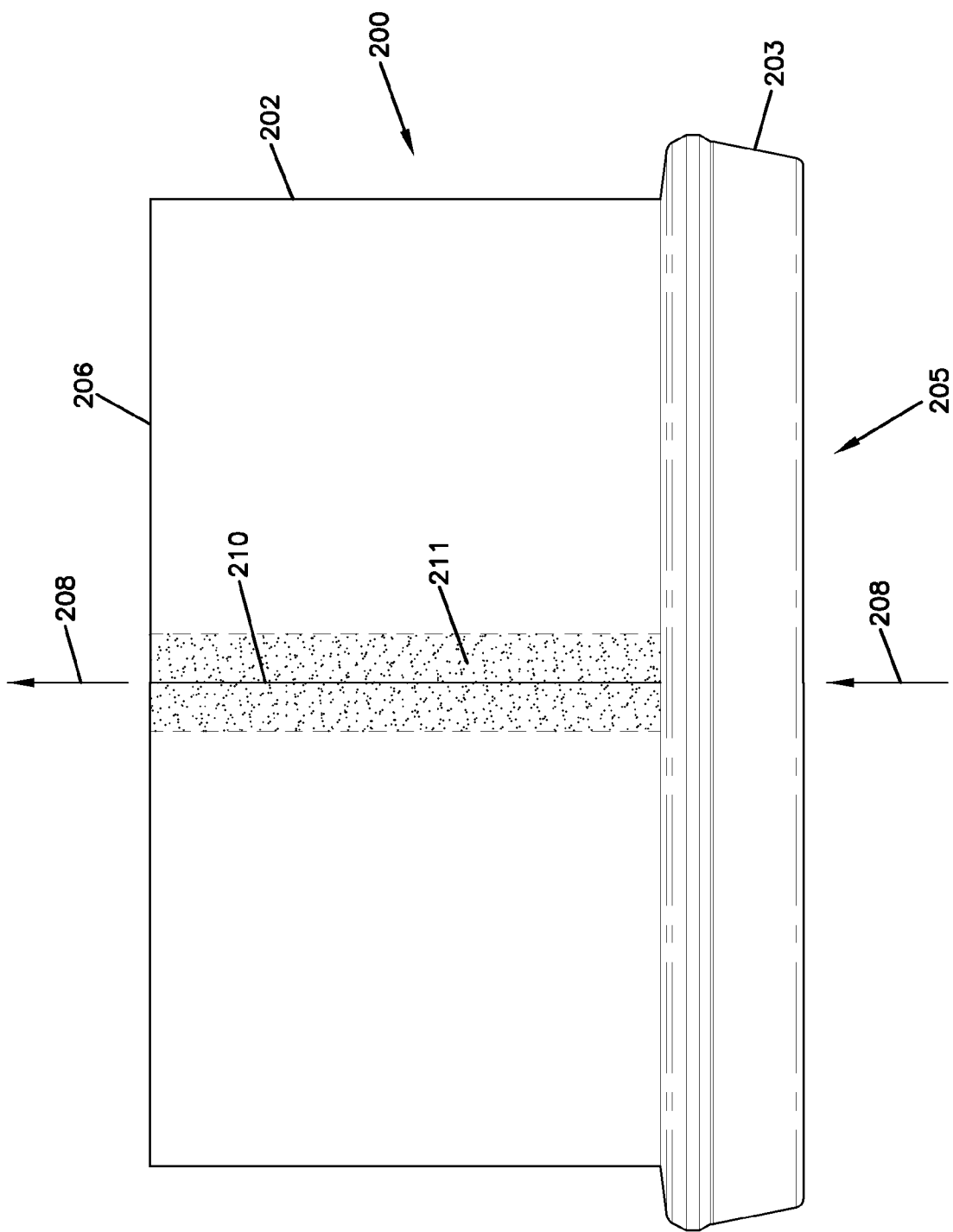
FIG. 7 is an enlarged, side elevational view of a filter cartridge useable as a component in an air cleaner according to the present disclosure.

The reference numeral 200, FIG. 7, indicates a filter cartridge according to the present disclosure. The filter cartridge 200 is a serviceable component of an air cleaner system. That is, in a typical air cleaner system, the filter cartridge 200 can be installed and be removed for servicing, for example by replacement, in time. The filter cartridge 200 may be used as cartridge 162, FIG. 6.

Referring to FIG. 7, filter cartridge 200 comprises media pack 202 and housing seal arrangement 203. In general, the media pack 202 comprises z-filter media as generally described above. An example would be a coiled arrangement of z-filter media comprising a fluted sheet secured to a facing sheet, with the facing sheet facing outwardly in the coil. The arrangement would define a plurality of inlet and outlet flutes extending between opposite flow faces. Referring to FIG. 7, the opposite flow faces are indicated generally at 205, 206. The filter cartridge 200 can be configured for preferred flow in either direction. However for a typical application, when installed in an air cleaner, filter cartridge 200 will be configured for air flow in the direction of arrows 208, i.e., with face 205 being an inlet flow face and face 206 being an exit flow face. (A center of the coil, as discussed below, should be closed to prevent unfiltered air flow through the media pack 202, i.e., between faces 205, 206.)

For the particular media pack 202 depicted, flow faces 205 and 206 are each generally planar. Alternate configurations are possible, but planar faces are convenient for use with the principles characterized herein.

Still referring to FIG. 7, at 210 a tail end of the media coil is depicted. For the example depicted, the tail end 210 is shown sealed closed. In particular, tail end 210 is sealed underneath a sealant region 211. The particular sealant region 211 comprises a hot melt sealant, polyurethane sealant or other sealant applied over tail end 210.

Figure 8:
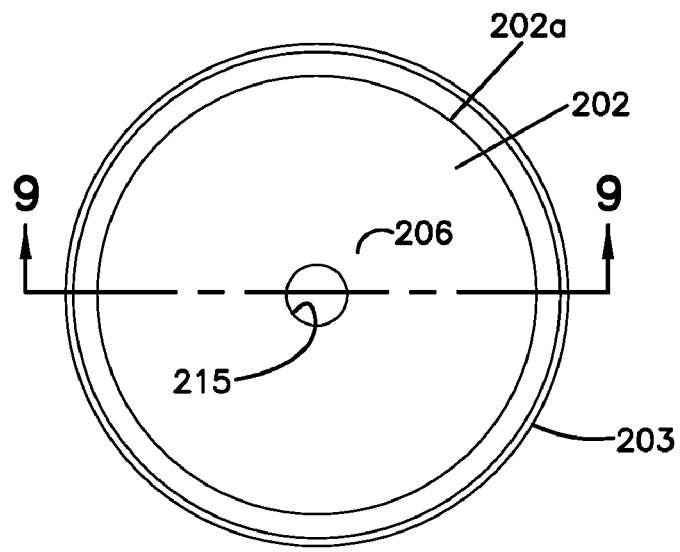
FIG. 8 is a schematic top plan view of the filter cartridge depicted in FIG. 7.

Referring to FIG. 8, the particular media pack 202 depicted, has a generally cylindrical shape, i.e., circular cross-section defining a cylindrical outer perimeter 202a. The principles described herein can be used with a variety of shapes of media packs, including ones having a generally oval shape, with two curved ends separated by sides, the sides either being curved or straight (as in a racetrack shaped element). Of course still other, alternative, shapes are possible.

Figure 9:
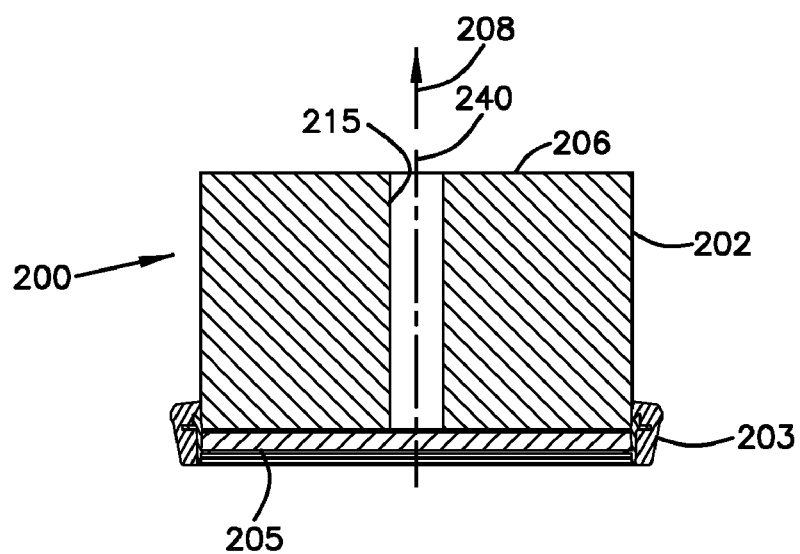
FIG. 9 is a schematic cross-sectional view taken along line 9-9, FIG. 8.

Referring to FIGS. 8 and 9, coiled media pack 202 defines a central core 215 discussed below. Again, the core 215 is preferably closed, to flow of unfiltered air therethrough.

Referring to FIG. 7, housing seal arrangement 203 is positioned and configured to provide for a seal between cartridge 200 and an air cleaner housing, when cartridge 200 is installed in use, to inhibit air from passing from adjacent face 205 to face 206, without passage through the media pack 202. To accomplish this, two features are required about the housing seal arrangement 203: (a) it is positioned and configured for sealing against housing componentry of an air cleaner; and (b) it is sealed to the media pack 202 such that leakage of flow between the seal arrangement 203 and the media pack 202 is inhibited.

A preferred housing seal arrangement 203 is characterized herein, for accomplishing of both these features.

In addition, under use conditions with air flow and thus pressure in the direction of arrow 208, a media pack 202 formed from a coil of single facer material, can, in some instances, tend to deform in the downstream direction, i.e., in the direction of arrow 208. The tendency to deform is in part a factor of: material chosen for the media; material chosen for the single facer seal and winding bead; and conditions of use. In some instances it is desirable to provide a mechanical support arrangement in the housing, on the media pack or both, to help resist this deformation. The particular air filter cartridge 200 depicted herein, includes a mechanical support arrangement to resist such telescoping of the media pack 202, at a location adjacent end face 205. When filter cartridge 200 is configured for flow face 205 to be an upstream flow face, this presents the situation of having the mechanical support arrangement (to resist telescoping) being positioned at the upstream end of the media pack 202, as described below.

Figure 10:
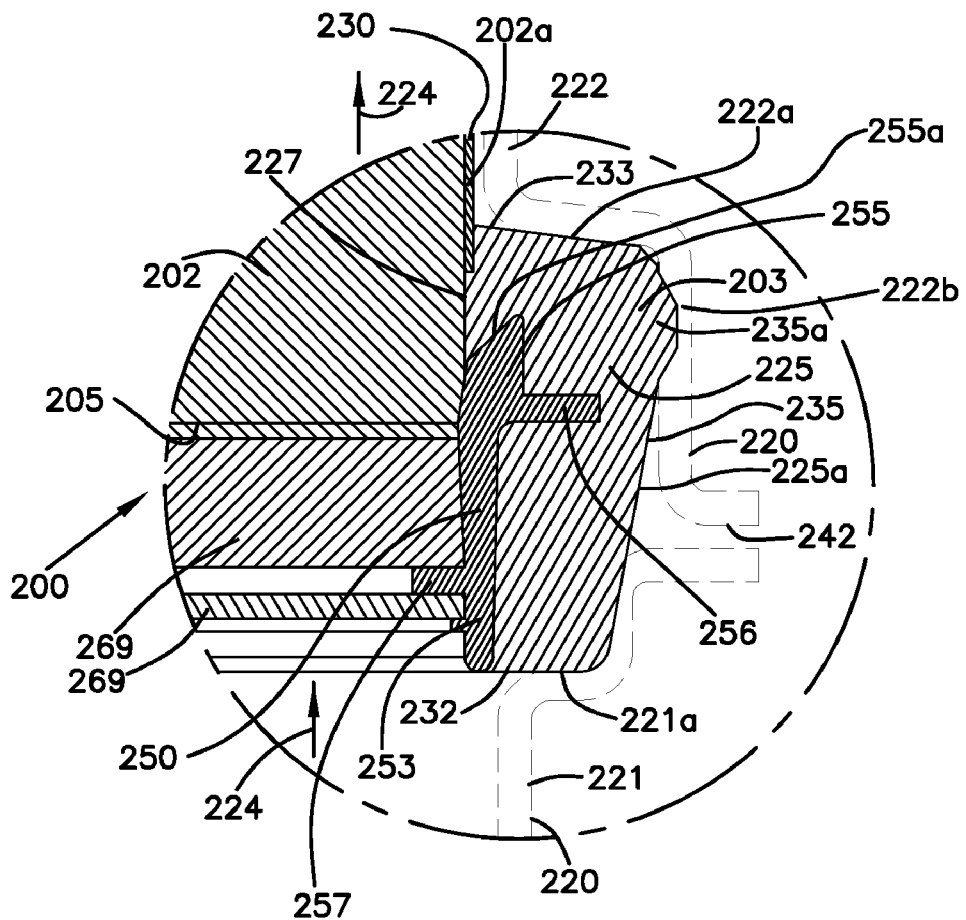
FIG. 10 is an enlarged, fragmentary, cross-sectional view of a portion of FIG. 9 showing the filter cartridge in sealing association with housing componentry of an air cleaner, is use.
Figure 14:
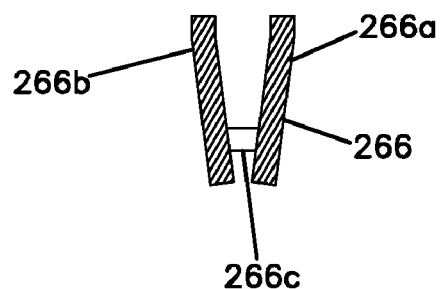
FIG. 14 is a cross-sectional view taken along line 14-14, FIG. 12.

Attention is now directed to FIG. 10, in which an enlarged, fragmentary, cross-sectional view of a portion of filter cartridge 200 is depicted in cross-sectional view. In FIG. 10 at 220, portions of a housing arrangement in which the serviceable filter cartridge 200 would be positioned, for use, are shown in broken lines. In particular the housing arrangement comprises inlet section 221 and outlet section 222, with a corresponding filtering flow in the direction of arrows 224.

Referring still to FIG. 10, at 225 a region of seal material comprising a portion of housing seal arrangement 203 is depicted. Region 225 is configured: (a) to engage a portion of an outside surface 202a of media pack 202, as shown at interface 227; and (b) to define a housing seal.

In general, region of seal material 225 would comprise a molded-in-place region, formed from a resin as described, generally, below. Typically a resin will be chosen to provide region 225 with an appropriate firmness or hardness, for installation in an air cleaner. A variety of materials can be used. Examples would include urethane. Preferred urethanes are foamed urethanes, typically ones that increase in volume at least 40%, preferably at least 80%, during care, although alternatives are possible. Although alternatives are possible, examples of useable urethanes include those having an as-molded density of no greater than 30 lbs/cu.ft. (0.48 g/cc), typically no greater than 22 lbs/cu.ft (0.35 g/cc) and usually within the range of 10 lbs/cu.ft (0.16 g/cc)-22 lbs/cu.ft. (0.35 g/cc). Such urethanes typically have a hardness, Shore A, of no greater than 30, typically no greater than 25 and usually within the range of 12 to 22. Of course urethane materials outside of the ranges stated are useable. The particular materials identified, however, are advantageous with respect to many systems, since the materials are both robust and sufficiently soft so as to be substantially compressible, under hand forces, to form a seal with the housing arrangement.

Herein above when it is stated that a region is "molded-in-place," it is meant that the material is molded in place in the filter cartridge or filter cartridge arrangement, from a resin. That is, the material is not preformed as a structure, and then attached to a portion of the filter cartridge.

In some instances, portions of a "molded-in-place" seal arrangement, may be characterized as "molded integral." When used in this manner, the term "molded integral" is meant to refer to two portions of molded-in-place material, which are molded in place at the same time and from an integral resin pool, i.e., resin material that, before cure, is continuous without an interface completely separating sections.

Still referring to FIG. 10, at 230 an optional label is shown attached to a portion of the outer periphery to 202a media pack 202. It is noted that in FIG. 10, label 230 is shown embedded within a portion of region 225, so that region 225 helps secure the label 230 in place. It is also noted that the label 230 is not embedded so far within region 225 that label 230 completely blocks direct interface between region 225 and media pack 202 therearound, for example as shown at interface 227. Thus, a seal leak between region 225 and media pack 202 is inhibited.

In the context of the previous paragraph the term "direct interface" is meant to refer to an interface between the two identified components, with nothing therebetween at the interface. In the instance described, there is reference to the molded-in-place region of seal material 225 and its interface 227 with the media pack 202. What is meant is that there is preferably a continuous perimeter of such interface, around the media pack 202, at some location, not interfered with by the label 230. Typically the direct interface with the media pack 202 will be with the single facer sheet itself, or with material, such as a sealant or protective material, applied to the single facer sheet.

Still referring to FIG. 10, outer periphery 225a of region 225 is shown with three general surfaces: (a) a first axially directed surface 232; (b) a second, generally opposite, axially directed surface 233; and, (c) an outer annular, radially directed surface 235 extending there between.

The term "axial" in this context, is meant to refer to a surface which generally faces a direction of extension of a central axis 240 (FIG. 9) of filter cartridge 200. For the particular region 225 described, surface 232 generally faces the same direction as flow face 205; and, surface 233 generally faces the same direction as flow surface 206. It is noted that for the example shown, surface 233 is not precisely parallel with end faces 205, 206 respectively. However in general it faces the same direction. Typically, when media pack end faces 205, 206 are planar as for the example shown, regions 233, 232 will be viewed as facing the same direction as the end faces, provided that extend at an acute angle, relative to a side of the media pack extending between the end faces 205, 206, within the range of 75°-90°, typically within the range of 80°-90°, and usually at least 85°.

Herein the term "radial" is indicated generally to refer to a direction toward or away from central axis 240, FIG. 9. Thus, annular surface 235 is a radially outwardly directed surface.

Region 235 can be configured to form a variety of types of seal with an air cleaner, in use. The particular region 235 depicted is configured to form a radial seal with an air cleaner housing; the seal involving a portion of annular surface 235. This can be understood by reference to FIG. 10.

In particular, when filter cartridge 200 is positioned within an air cleaner housing 220, components or sections 221 and 222 are clamped toward one another. Region 235 is positioned for engagement with the air cleaner as follows: surface 232 will engage shelf 221a of air cleaner inlet section 221; surface 233 will engage shelf 222a of air cleaner outlet section 222; and, region 235a of annular surface 235 will form a radial seal with the housing, in this instance with extension 222b of outlet section 222. In FIG. 10, region 235a is shown not distorted from the sealing force, and thus is depicted overlapping a portion of region 222b. In an actual installation with region 235 comprising a sufficiently compressible material; region 235a would be deformed inwardly toward the media pack 202 in forming the radial seal.

It is noted that for the example shown, region 235a is configured to engage the outlet portion or section 222. Thus the seal formed 235a is downstream of the interface 242 between the two housing portions 221, 222. This means that any leakage at this interface, will not leak past the seal 235a, to the downstream or outlet end of the housing.

Sections 222 and 221 can be configured to bottom out, or engage one another, after a desired amount of pinching toward one another during assembly.

It is noted that for the particular region 225 depicted, surface 235 tapers generally outwardly in size (or thickness out from the media pack 202) in extension toward an apex in region 235a, from surface 232; and tapers inwardly in size (or thickness out from the media pack 202) in extension from region 235a toward surface 233. This can help with formation and installation, although a variety of surface contours or definitions can be provided. At apex 235a, material within region 225 would be compressed the greatest extent, during radial sealing.

Still referring to FIG. 10, attention is directed to preform 250. Herein the term "preform" in this context is meant to refer to a component of the filter cartridge 202, other than the media pack 202, which is formed and then brought into contact with the media pack 202 before region 225 is molded in place. Thus preform 250 is secured to the media pack 202, in part, by molded-in-place region of seal material 225. For the particular filter cartridge 200 depicted, preform 250 is a ring structure 253 defining: projection 255 which surrounds the media pack 202; outwardly projecting annular radial lip 256, which is embedded within region 225 of seal material; and grid work 257, which extends across flow face 205 as discussed below. The shape defined by ring structure 253 will generally correspond to the outer peripheral shape of the media pack 202. Thus, in the example shown, ring structure 253 defines a generally circular outer perimeter.

Still referring to FIG. 10, it is noted that a portion of preform 250 is located between at least a portion of radial seal area 235a, and the media pack 202. This will be preferred in some applications, since it ensures there is a rigid preform structure backing up at least some of the compression of the radial seal material in this region.

Figure 11:
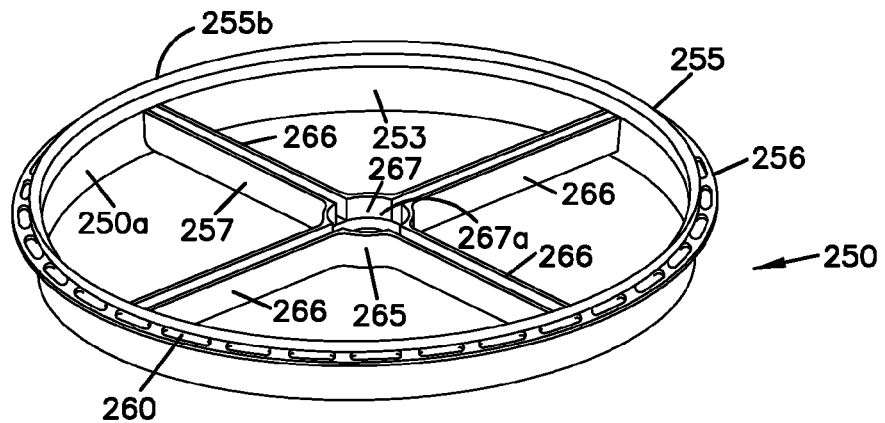
FIG. 11 is a perspective view of a preform component used in the filter cartridge of FIG. 7.
Figure 12:
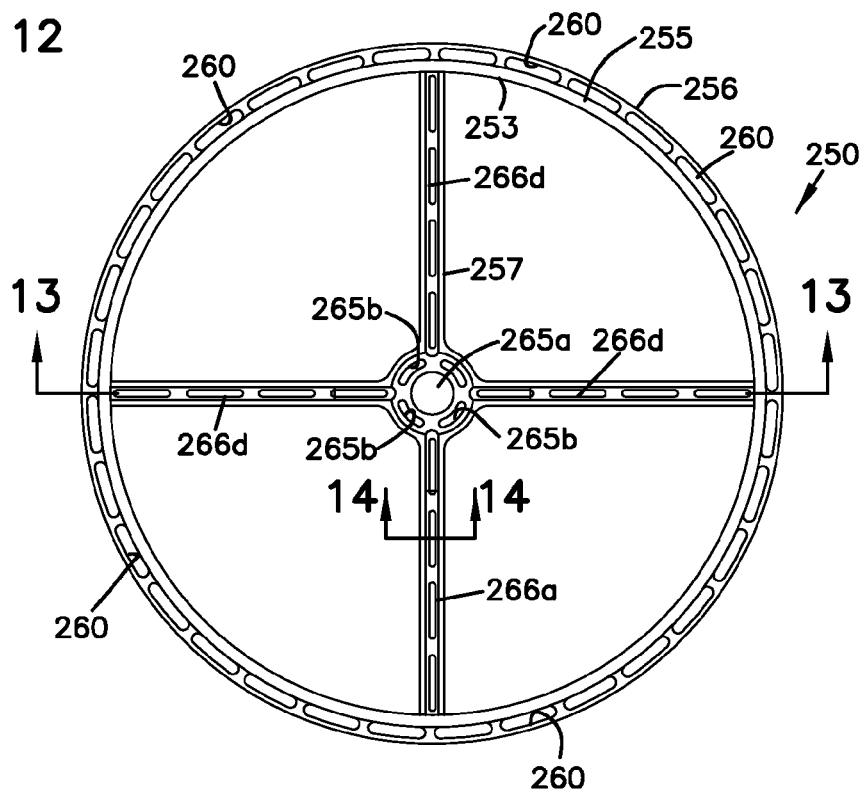
FIG. 12 is a top plan view of the preform component of FIG. 11.
Figure 13:
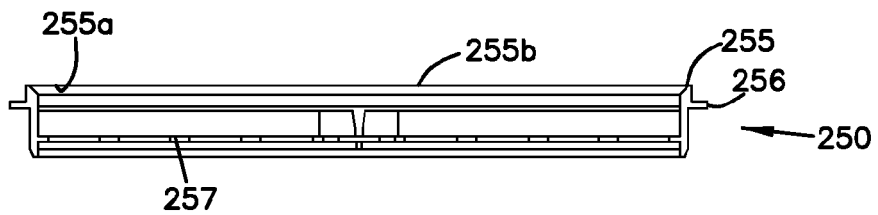
FIG. 13 is a cross-sectional view taken along line 13-13, FIG. 12.

The preform 250 used in cartridge 200, FIGS. 7 and 10, is shown in detail in FIGS. 11-13, separated from the cartridge.

Referring to FIG. 11, the general components of the preform 250 include: (1) ring structure 253 having projection 255; (2) lip 256; and, (3) grid work 257.

Referring to FIG. 12, lip 256 is shown having an aperture arrangement, in this instance comprising a plurality of apertures 260, therein, which extend through lip 256. Aperture arrangement or aperture 260 allow resin to flow through, as region seal material 225 is molded-in-place. In such a molding operation, preform 250 will become mechanically secured within region of seal material 225, since the material 225 will cure with extension through the aperture arrangement 260. Although alternatives are possible, the orientation of the apertures 260 reflect a preferred molding operation in which the preform 250 is oriented in a mold in the general orientation as shown in FIG. 10, with the resin material which forms region 225 rising upwardly, during cure. This will be discussed further below.

Referring to FIG. 10, in the cross-section of preform 250 shown in FIG. 13, it is noted that projection 255 includes an outwardly projecting surface portion 255a which is directed obliquely away from media pack 202. This helps media pack 202 insertion into projection 255. It also provides location for resin flow to ensure engagement with media pack 202 at interface 227, inhibiting leakage between the media pack 202 and the preform 250.

Referring to FIG. 11, grid work 257 is recessed from edge or tip 255b of projection 255. In a typical cartridge 200, media pack 202 would be inserted past edge 255b until the media pack flow surface 205 abuts grid work 257. Thus, grid work 257 will typically be configured to define, and extend across, a surface corresponding to flow surface 205. In the example, the flow surface 205 is planar, so the grid work 257 is planar in this region, as shown.

Referring to FIG. 11, the example grid work 257 shown generally defines center 265 and radial legs 266. The center 265 generally defines a cup 267 with a side wall 267a defining an open region with a bottom 265a, FIG. 12, having apertures 265b therethrough. The apertures 265b are flow apertures, allowing resin to flow therethrough during formation of the cartridge 200, to provide a mechanical connection at this point, as described below. The cup 267 is oriented with bottom 265a spaced from the media pack, in the cartridge 200.

The radial legs 266 generally each comprise side walls 266a, 266b (FIG. 14) and a center base 266c. The center base 266c has resin flow apertures 266d therein, FIG. 12, to allow resin flow therethrough for definition of a mechanical interaction, during formation of cartridge 200, discussed below. The opposite side walls 266a, 266b generally define a trough region 268 to contain resin adjacent a media pack flow surface 205, as discussed below. For the particular arrangement shown, FIG. 11, the trough regions 268 comprise a plurality of (in the example shown four) spokes terminating at ring 250a defined by preform 250.

For an arrangement utilizing preform 250, FIGS. 11-13, applied to form an arrangement according to FIG. 10, two molded-in-place regions of seal or resin material would be generated:

1. a first corresponding to region 225 which forms (a) a seal to the media pack; (b) a housing seal arrangement; and, (c) mechanical securing of the form 250 around an outer perimeter thereof; and, 2. a second shown at 269, FIG. 10, which is positioned within cup 265 and troughs 268, FIG. 11, and which engages the media pack at surface 205, to inhibit telescoping.

The preform 250 could be configured so that these regions (225, 269) are integrally molded with one another, if desired, for example by having apertures in ring 250a, FIG. 11, the ends of the troughs 268. However, with the particular preform 250 depicted, could generate these two regions as separate from one another, not having a direct interface between the two.

Construction of a cartridge 200 will generally be as follows, a mold will be provided with: a mold cavity having an outer surface configured to form all or a portion of annular surface 235 of region 225; and, a bottom configured to receive preform 250 therein. The preform 250 would be positioned within the mold cavity. Resin would be poured into the mold cavity within: cup 265, trough regions 268 and an annular portion of the mold cavity configured to form region 225. The media pack would then be inserted in position within projection 255. (In some instances the media pack could be inserted before the resin to form region 225 is poured.) The mold would typically include a cover positioned around the media pack, to define resin rise such that, for example, surface 233 would be defined. The resin would be allowed to rise and cure. During this process:

1. the resin would flow through apertures 260, securing the preform in position;
2. the resin would flow through apertures 265a and 266a, further securing the preform 250 in position; and,
3. the resin would rise within the trough arrangement 268 defined by legs 257, to engage the media pack surface 205, in a region of the media pack 202 in overlap with legs 257. Spread across the surface 205 would be inhibited, by engagement between the media pack surface 205 and the grid work arrangement 257. However resin rise into engagement with the media pack 202, and then cure, would physically secure surface 205 to the grid work 257. This would stabilize surface 205 against telescoping, during use.

After cure, of course, the cartridge 200 could be separated from the mold arrangement.

Referring to FIG. 9, it is noted that resin material positioned within central cup 267, FIG. 12, is positioned to rise into core 215 at least partially, to close the core 215 against flow therethrough, of unfiltered air.

When the media pack is configured for use such that the upstream end or face 205 is the face across which the grid of the preform 250 extends, and thus is the face across which the grid is secured to the face by the cured resin, the result is a media pack which in use is inhibited from telescoping at least in part by grid work extending across the upstream end, in contact with the media pack. In some instances this can be advantageously used to avoid the introduction of grid work or other structure on the downstream end of the media pack, either on the media pack or in the housing, to inhibit telescoping.

Either end of the media pack can be used as the upstream end, even when the media pack has darted flutes at one end corresponding to the flutes of FIG. 5. However when darted flutes according to FIG. 5 are used, it may in some instances be convenient to position the opposite end of the media pack as upstream face 205.

The choice of which end of the media pack is used at the upstream face, for engagement with the preform 250, the choice will be determined by such factors as: (a) if fine fibers is applied to only facing sheet, which end would result in the inlet flutes having the fine fiber application on the upstream surface; (b) which end face is smoother and more easy for engagement by the seal material and the grid work, during formation; and (c) which end has a winding bead, when factors of the manufacturing require (or prefer) winding bead overlap with certain portions of the structure added in association with the preform 250 and molded polymer (typically urethane) features.

C. Lead End Seal and Tail End Seal.

As indicated above, and generally when the media pack 202 is formed by coiling a single facer strip of fluted sheet secured to facing sheet, seals are needed (or at least preferred) at the lead end and the tail end of the coil. With respect to the tail end, a possibility was discussed above in connection with FIG. 7, of applying a sealant 211 over the tail end 210, to provide the seal. Alternatives are possible.

In general, at the lead end and tail end, two types of seals can be of concern: (a) a seal within the single facer strip, between the fluted sheet and the facing sheet, along the lead and tail edges; and, (2) a seal between the end of the lead end or tail end and the next overlapping (or overlapped) coil.

Whether or not seals at these locations is of concern, will in part depend on the nature of the media pack 202 and the location of other seals.

Referring to FIG. 9, if the winding bead for the media pack 202 is located adjacent surface 205 in overlap with housing seal arrangement 203, leakage of unfiltered air between coils, adjacent surface 205, with air flow in the direction of arrow 208 will not be a problem. This is because the winding bead provides a seal at this location, so air cannot pass between layers of the coil. Thus, at the lead end or tail end of this region, the issue of concern would be the sealing of the fluted sheet to the facing sheet along this edge. With respect to the tail end, FIG. 7, this is managed by sealant 211. An issue relates to sealing of this portion of the media pack, at the lead end positioned within core 215.

One approach would be to pour enough sealing material within the core 215, FIG. 9, filling up the core and sealing the lead end. Approaches related to this are described for example in U.S. Provisional 60/578,482 filed Jun. 8, 2004, incorporated herein by reference.

Another approach would be to provide the lead end (or both the lead end and the tail end) with edge seals of the type described in U.S. Provisional 60/591,280 filed Jul. 26, 2004, at FIG. 10. In general these are described herein in connection with FIG. 15, as follows.

Figure 15:
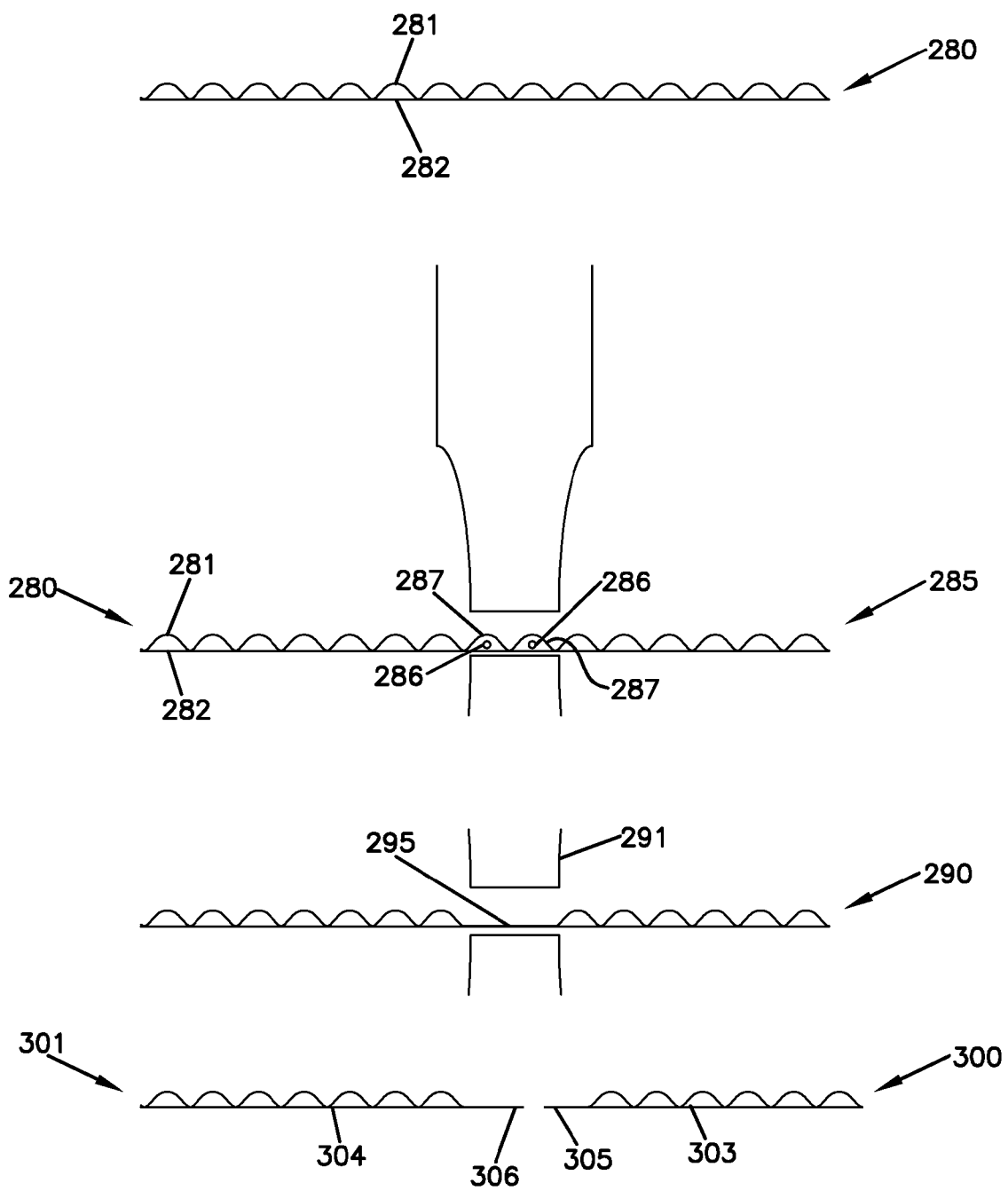
FIG. 15 is a schematic process diagram of a step of sealing an adjacent tail end and lead end of a strip of z-filter media useable in an arrangement according to the present disclosure.

Referring to FIG. 15, at 280 a continuous strip of single facer material is shown comprising corrugated (or fluted) sheet 281 secured to facing sheet 282. At station 285 a strip 286 of material are shown inserted into at least one, and typically into two adjacent, corrugations (flutes) 287. The strips 286 would typically comprise an ultrasonically weldable polymeric material, inserted as a long strip for example similar to a fish line. Useable materials include nylon, polypropylenes and/or polyethylene lines, typically 0.025-0.080 inch in diameter (0.6-2 mm). The strips 286 preferably extend completely through corrugations 287.

At station 290 the ultrasonic (sonic) welding horn 291 is shown having welded and compressed corrugations (flutes) 287 closed, at region 295. The strips 286, will have been deformed and welded, to seal the corrugations (flutes) 287 closed.

At station 300, the resulting strip 301 is shown cut into section 303 and 304. As an example, section 303 could comprise a strip of single facer material with sealed tail end 305, and section 304 could comprise a strip of single facer material with lead end 306.

Each of the strips would be sealed at its opposite ends, by a similar process. Each of the strips could then be coiled to form the media pack coil 202, FIG. 7.

Of course alternate methods of sealing the lead and tail ends can be used, including application of a sealant such as a hot melt or other liquid sealant across the material at these locations.

When such seals as described above in connection with FIG. 15 are used as lead end seals and tail end seals; and, the winding bead is adjacent the inlet face 205 and overlapped by the housing seal arrangement 203, it is noted that a seal strip as shown at 211, FIG. 7, along the tail end 210 is not needed. The tail end 210 can simply be tacked down by an adhesive label or other structure, for example. The label can be chosen to have a portion positioned to be shown at FIG. 10 at label 230, which is embedded within the molded region 225, to help secure the label in position, through the lifetime of the resulting filter cartridge 200.

D. Alternate Single Facer Formation, FIGS. 16A-B.

In some instances, it may be desirable to provide the media pack 202 with an end face, for attachment of the preform 250, that is a clean, cut, planar surface. This would correspond, for example, to surface 205, FIGS. 7-10.

One approach to formation of a media pack with such a surface, would involve a step of cutting through an edge seal, to form the surface. This could be done by cutting through the sealant material along an edge of a media pack formed by coiling the media 1 depicted in FIG. 1, if desired. An issue with this approach is that it wastes material. Also, control to form a planar surface may be limited by the ability to coil properly.

Figure 16A:
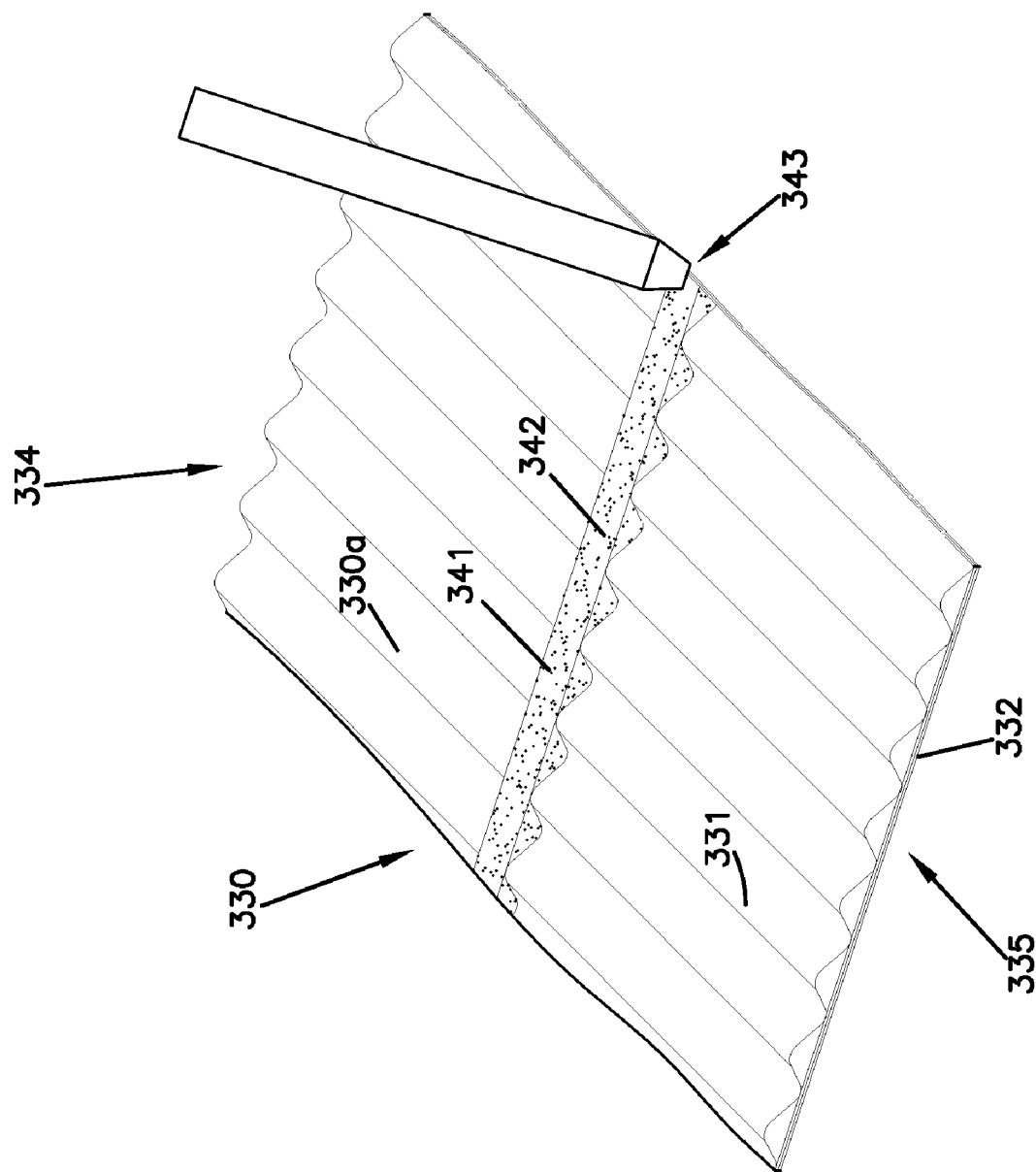
FIG. 16A is a schematic depiction of a step in a process of forming a media pack according to the present disclosure.
Figure 16B:
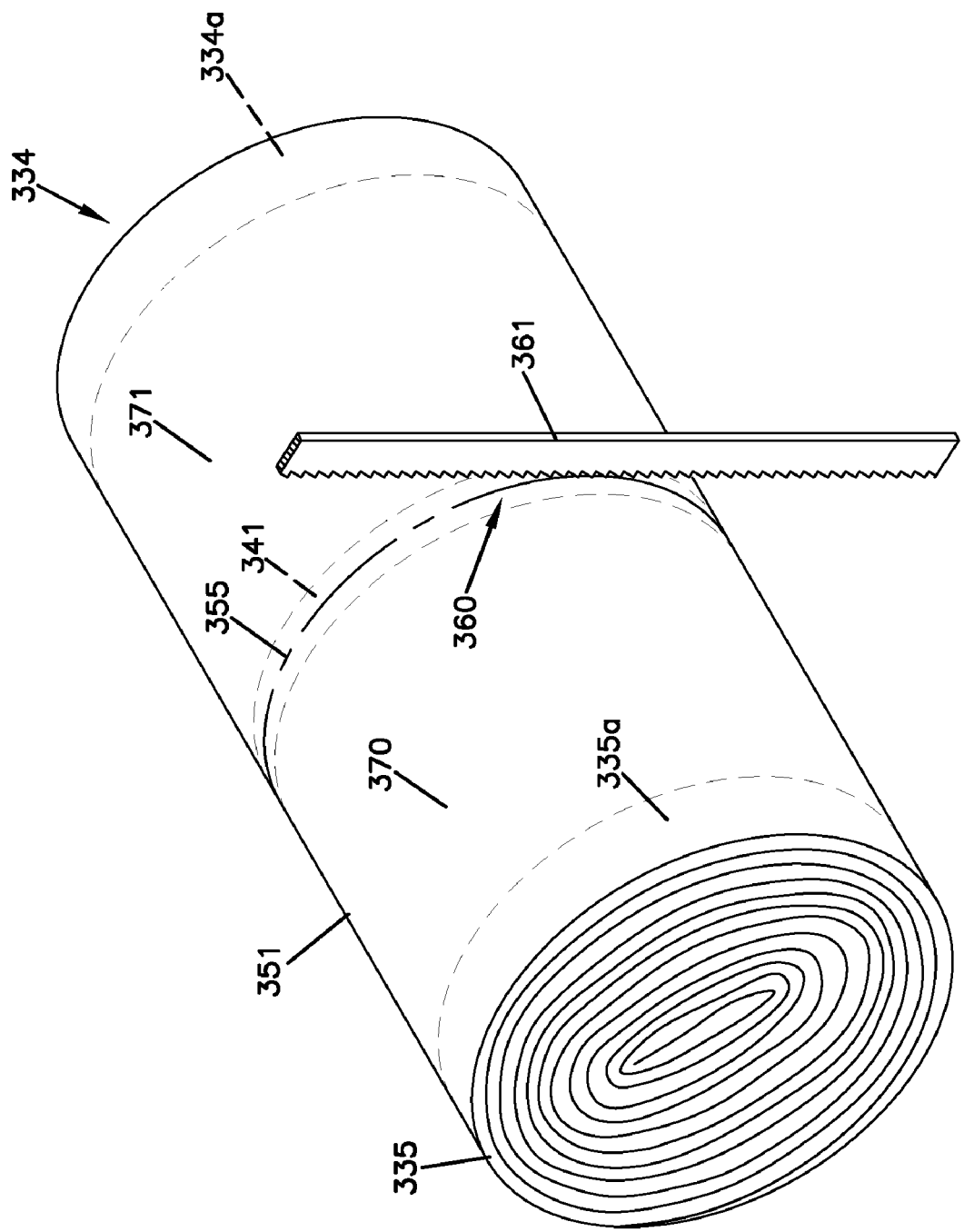
FIG. 16B is a schematic depiction of a step following the step of FIG. 16A.

Another approach to forming a media pack, but avoiding these types of issues, is shown in FIGS. 16A and 16B. Referring to FIG. 16A, at 330 a strip of material comprising a corrugated sheet 331 secured to facing sheet 332 is shown. In FIG. 16A, strip 330 is shown fragmented, with features at the opposite edges 334, 335 not being viewed, since only a central portion 330*a* of strip 330 is depicted. At 341, a winding bead of sealant material 342 is being shown applied by dispenser 343, in this instance to a corrugated surface 331, opposite the facing sheet 332.

This application is to a central region, spaced from opposite edges (generally near 334, 335). Although the application is not necessarily at a geometric center between edges 334, 335, it typically would be. The term "central region" and variants thereof, in this context, is not meant to require location at a geometric center, unless so stated. Following the step of FIG. 16A, the resulting strip 330 would be coiled.

In FIG. 16B, a coil 351 formed from strip 330 is depicted. The opposite edges 334 and 335 are viewable. In FIG. 16B, the coil 351 is shown being cut along line 355, at a location 360 by cutting apparatus 361. Line 355 overlaps winding bead 341. After the cutting process, two media packs will be formed at 370, 371, each having a face resulting from the cutting at line 355, which is a smooth planar surface through the winding bead 341. The media packs 370, 371 can be the same size or have different lengths, depending on whether the cut line 360 is in the exact center, or offset. The resulting packs 370, 371, can be used in a filter cartridge according to FIG. 7, or in an alternate type of z-filter cartridge.

Such a smooth planar surface can be particularly desirable, for attachment of a preform such as preform 250, to form filter cartridge is according to the processes described hereinabove.

In FIG. 16B, it is noted that along sides 334, 335, edge single facer seals 334*a* and 335*a*, respectively are shown.

It is noted that the process discussed in connection with FIG. 16B is operated on a coiled media pack having a generally circular outer perimeter. Of course the approach can be applied to any coiled media arrangement, including ones that are coiled having an oval exterior, with two opposite curved ends and two opposite sides; including oval ones in which the two opposite sides are also curved or in which the two opposite sides are generally straight and parallel to one another.

What is claimed is:

1. An air filter cartridge comprising:
   (a) a media pack comprising a plurality of inlet flutes and outlet flutes extending between first and second, opposite, flow faces and formed from an arrangement of a facing sheet secured to a corrugated sheet and coiled;
      (i) the media pack defining an outer periphery; and,
      (ii) the media pack being configured for air flow in a direction between the opposite flow faces;
   (b) a preform secured to the media pack adjacent one of the first and second, opposite, flow faces;
      (i) the preform including a projection surrounding the media pack; and
      (ii) the projection surrounding the media pack including a portion directed radially away from the media pack; and
   (c) a molded-in-place region of seal material;
      (i) the molded-in-place region of seal material defining a radially outwardly directed surface defining a housing radial seal; and,
      (ii) the molded-in-place region of seal material having embedded therein at least part of the portion of the preform that is directed radially away from the media pack.

2. An air filter cartridge according to claim 1 wherein:
   (a) the molded-in-place region of seal material defines a seal between the preform and the media pack at a location surrounding the media pack.

3. An air filter cartridge according to claim 1 wherein:
   (a) the projection of the preform surrounding the media pack includes a plurality of apertures therein, through which the molded-in-place region of seal material extends.

4. An air filter cartridge according to claim 1 wherein:
   (a) the plurality of apertures include apertures positioned in the portion of the preform directed radially away from the media pack.

5. An air filter cartridge according to claim 3 wherein:
   (a) the preform includes a grid arrangement extending across a flow face.

6. An air filter cartridge according to claim 1 wherein:
   (a) the molded-in-place region of seal material defines the radially outwardly directed surface defining a housing radial seal at a location surrounding the media pack.

7. An air filter cartridge according to claim 6 wherein:
   (a) the radially outwardly directed seal surface tapers inwardly from a thickest portion toward an end.

* * * * *